April 25, 1939.  H. C. HOWER  2,155,972
TIRE
Filed Jan. 2, 1937
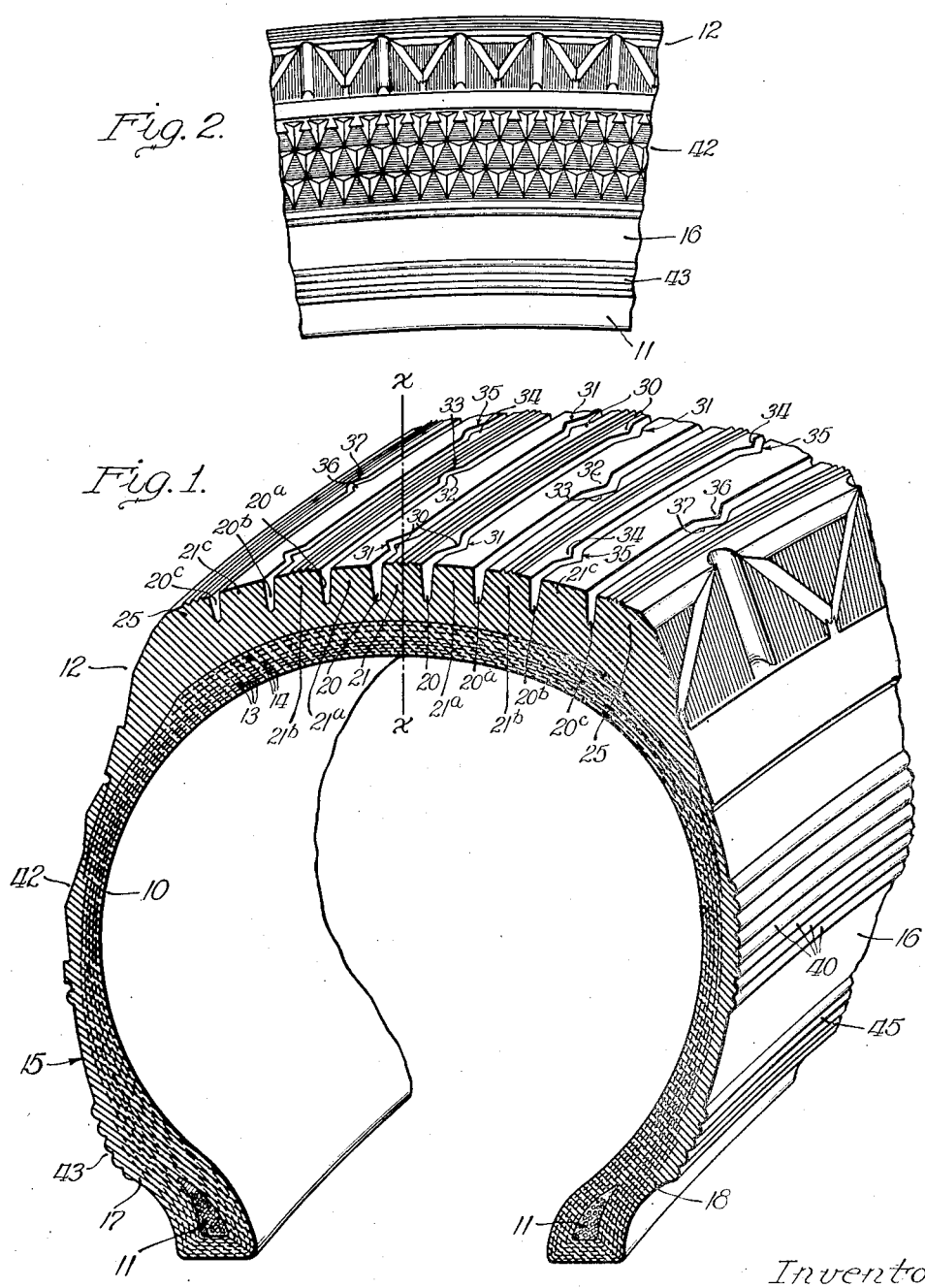
Inventor:
Harry C. Hower
By: Brown, Jackson, Boettcher & Dienner
Attys.

Patented Apr. 25, 1939

2,155,972

UNITED STATES PATENT OFFICE 2,155,972

TIRE

Harry C. Hower, Chicago, Ill.

Application January 2, 1937, Serial No. 118,806

6 Claims. (Cl. 152—209)

This invention relates to tires, and more particularly to an improved tread and side wall construction therefor.

While the particular tire which I shall describe hereinafter in connection with the drawing is a pneumatic automobile tire of the low pressure or "balloon" type, it is to be understood that the invention is not limited in this respect but may be employed otherwise as suitable or desired.

One of the main objects of my invention is to provide in a tire having a circumferentially ribbed tread, the ribs of which are sufficiently stable not to be stretched and bowed into contacting and serpentine form when subjected to frictional thrusts in the direction of travel, an improved construction providing the desired flexibility along the center of the tire and greater stiffness along the load carrying portions adjacent the side shoulders of the tire.

It is also an object of my invention to provide, in a tire, opposite side walls having different designs embodied in the original construction thereof, whereby different tastes may be satisfied with the same tire, whereas different tires have heretofore been necessary to accomplish this result; also, a tread having an improved non-skid button construction embodied therein in staggered relation.

Further objects and advantages of the invention will be apparent from the following detailed description taken in connection with the accompanying drawing, in which:

Figure 1 is a fragmentary perspective view, in section, showing one embodiment of the present invention; and Figure 2 is a fragmentary side elevational view of the tire shown in Figure 1, showing the design on the side wall opposite the side wall shown externally in Figure 1.

Referring to the drawing, the tire selected for illustration comprises the carcass 10 having beads 11 and a tread 12.

The carcass 10 is formed of alternate layers of cords 13 and rubber 14 in the usual or any suitable manner—for example, in the manner more fully disclosed in my copending application Serial No. 56,672, filed December 30, 1935. The outer or side wall surfaces 15 and 16 are formed by rubber flanking strips 17 and 18 suitably secured over and covering the sides of the tire. A layer 19 of cushion stock may be provided between the tread portion 12 and the carcass 10.

The character of the rubber constituting the tread 12 and the carcass rubber, i. e. the rubber 14 surrounding the cords 13, may be as disclosed in my copending application above referred to, or otherwise as suitable or desired.

The tread 12 is divided by a plurality of circumferential tread grooves 20—20, 20a—20a, 20b—20b and 20c—20c, into a plurality of tread ribs 21, 21a—21a, 21b—21b and 21c—21c. The circumferential side shoulders of the tread are indicated at 25, 25. The tread grooves are sufficient in number to provide the desired flexibility. The illustrated embodiment of the invention has eight circumferential tread grooves. A smaller tire may have ten circumferential tread grooves, and other departures from the precise number of tread ribs and grooves shown and described are contemplated within the scope of the present invention. So far as I am now aware, the tread will have at least five or six circumferential tread grooves and not more than eleven or twelve such grooves for the different sizes of tires now in common use. The requirements may change, however, so as to necessitate more or less such tread grooves, and therefore I do not intend to be limited to the precise range of such grooves above set forth.

The tread ribs are all preferably sufficiently stable not to be stretched and bowed into contacting and serpentine form when subjected to frictional thrusts in the direction of travel, as contemplated by certain tires now known in the art. The two tread grooves 20—20 adjacent the circumferential median line of the tread are of a depth not substantially or materially greater than the width of the adjacent center tread rib 21. The next adjacent tread ribs 21a—21a are slightly wider than the center tread rib 21, and the next adjacent tread grooves 20a—20a are of slightly less depth than the tread grooves 20—20. The next adjacent tread ribs 21b—21b outwardly of the tread of the tire are slightly wider than the tread ribs 21a—21a, and the next adjacent tread grooves 20b—20b are of slightly less depth than the tread grooves 20a—20a. The next adjacent tread ribs 21c—21c, outwardly of the tread, are slightly wider than the tread ribs 21b—21b, and the next adjacent tread grooves 20c—20c are of slightly less depth than the tread grooves 20b—20b. The tread shoulders 25—25 are of materially greater width than the outer tread ribs 21c—21c.

As illustrative of one satisfactory practical embodiment of the invention, the center tread rib 21 is about $29/64$ of an inch wide, the two tread grooves 20—20 adjacent this center rib 21 are about $27/64$ of an inch deep. The ribs 21a—21a are about $31/64$ of an inch wide, the grooves 20a—20a are about $25/64$ of an inch deep, the ribs 21b—21b are about $33/64$ of an inch wide, the grooves 20b—20b are about $23/64$ of an inch deep, the ribs 21c—21c are about $35/64$ of an inch wide, the grooves 20c—20c are about $21/64$ of an inch deep, and the side shoulders 25—25 are proportioned approximately as shown in Figure 1 of the drawing. The above dimensions are illustrative and in nowise limiting of the present invention, and may vary widely within the scope of the appended claims.

From the foregoing it will be apparent that the tread of the tire is divided by a plurality of circumferential tread grooves into a plurality of tread ribs, these ribs being of a width at least as great as the depth of the grooves throughout and the ribs being of progressively decreasing depth and progressively increasing width from the center or circumferential median line of the tire, indicated at x—x in Figure 1, to the opposite sides of the tread. This provides, in conjunction with the stable rib construction set forth, a ribbed tread having the desired flexibility at the center and gradually stiffened outwardly to the load carrying portions adjacent the side shoulders 25—25. Better distribution of the load and an improved action are thus obtained without cupping or other objectionable results in use. Furthermore, in addition to the stability of the individual circumferential tread ribs, the resulting tire has improved stability which eliminates side sway in operation and makes steering of the vehicle easier.

The center tread rib 21 is provided at spaced intervals along its opposite sides with integral laterally extending tread rib projections or buttons 30, and the sides of the ribs 21a—21a, positioned toward the rib 21, have recesses 31 in register with the tread rib projections or buttons 30. The opposite or outer sides of the ribs 21a—21a have integral laterally extending tread rib projections or buttons 32 similar to the tread rib projections or buttons 30 but staggered with respect thereto, and the sides of the ribs 21b—21b, presented toward the ribs 21a—21a, have recesses 33 similar to the recesses 31 and in register with the tread rib projections or buttons 32. The opposite sides of the ribs 21b—21b have tread rib projections or buttons 34 staggered with respect to the tread rib projections or buttons 32 and the adjacent sides of the ribs 21c—21c have recesses 35 similar to the recesses 31 and 33 and in register with the tread rib projections or buttons 34. The opposite sides of the ribs 21c—21c have tread rib projections or buttons 36 staggered with respect to the tread rib projections or buttons 34, and the side shoulders 25—25 have recesses 37 in register therewith. A staggered non-skid button or tread rib projection arrangement is thus provided circumferentially about the tread of the tire.

The outer side walls of the tire have different designs embodied in the original construction thereof. In the illustrated embodiment of the invention, the outer surface 16 of the flanking strip 18 has a plurality of annular beads 40 molded therein, and the outer surface 15 of the opposite flanking strip 17 has a plurality of rows of raised triangular or generally pyramid shaped figures molded therein annularly about the side of the tire as shown at 42 in Figure 2. Inwardly of the design at 42 the flanking strip 17 has molded or formed therein, in the original construction thereof, a plurality of annular beads 43, and the flanking strip 18 at the opposite side of the tire has a plurality of annular beads 45 formed and located similar to the beads 43.

While the particular designs at 40 and 42 may be varied widely within the scope of the present invention by making the designs on opposite sides of the tire different, the same tire will satisfy different tastes, whereas heretofore different tires have been necessary to accomplish this result. With the tire on the car in one position, one design is presented outwardly to view to give one effect, and by reversal of the tire on the wheel the other design is presented outwardly to give a different effect. The flanking strips covering the sides of the tire are preferably formed of white or relatively light colored rubber, but this may be varied within the scope of the present invention. The outer sides of the side shoulders 25—25 have designs 48 molded or otherwise embodied therein in the original construction.

I do not intend to be limited to the precise details shown or described.

I claim:

1. A tire having a tread divided by a plurality of circumferential tread grooves into a plurality of tread ribs, each of said ribs being of progressively decreasing depth and progressively increasing width from the median plane of the tire to the opposite sides of the tread.

2. A tire having a tread divided by a plurality of circumferential tread grooves into a plurality of tread ribs, each of said ribs being of progressively decreasing depth and progressively increasing width from the median plane of the tire to the opposite sides of the tread, and relatively heavy annular side shoulders at opposite sides of said tread.

3. A tire having a tread divided by a plurality of circumferential tread grooves into a plurality of tread ribs, said ribs each having a sufficiently large cross-sectional area to be inherently stable and thereby to resist being stretched and bowed into contacting and serpentine form when subjected to frictional thrusts in the direction of travel and each of said ribs having progressively decreasing depth and progressively increasing width from the median plane of the tire to the opposite sides of the tread.

4. A tire having a tread divided by a plurality of circumferential tread grooves into a plurality of tread ribs, said ribs each having a sufficiently large cross-sectional area to be inherently stable and thereby to resist being stretched and bowed into contacting and serpentine form when subjected to frictional thrusts in the direction of travel and each of said ribs having progressively decreasing depth from the median plane of the tire to the opposite sides of the tread.

5. A tire having a tread divided by a plurality of circumferential tread grooves into a plurality of tread ribs, each of said ribs being of progressively decreasing depth and progressively increasing width from the median plane of the tire to the opposite sides of the tread, and integral non-skid buttons and registering recesses arranged in staggered relation along the sides of the tread ribs at spaced intervals circumferentially about the tire.

6. A tire having a tread divided by a plurality of circumferential tread grooves into a plurality of tread ribs, said ribs being of minimum width and maximum depth adjacent the median plane of the tire to provide minimum support and maximum flexibility along said median plane and of progressively greater width and less depth from said median plane to the opposite sides of the tread to provide progressively increasing support and progressively decreasing flexibility along said opposite sides.

HARRY C. HOWER.